United States Patent
Wei et al.

(10) Patent No.: US 12,192,823 B2
(45) Date of Patent: *Jan. 7, 2025

(54) METHOD AND APPARATUS FOR ESTABLISHING GUARANTEED BIT RATE (GBR) QUALITY OF SERVICE (QoS) FLOW IN SESSION

(71) Applicant: Huawei Technologies Co., Ltd., Shenzhen (CN)

(72) Inventors: Anni Wei, Shenzhen (CN); Haiyang Sun, Beijing (CN); Chunshan Xiong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/951,765

(22) Filed: Sep. 23, 2022

(65) Prior Publication Data
US 2023/0422082 A1 Dec. 28, 2023

Related U.S. Application Data

(63) Continuation of application No. 17/100,367, filed on Nov. 20, 2020, now Pat. No. 11,477,689, which is a
(Continued)

(51) Int. Cl.
*H04W 8/08* (2009.01)
*H04M 15/00* (2006.01)
(Continued)

(52) U.S. Cl.
CPC ....... *H04W 28/0268* (2013.01); *H04M 15/66* (2013.01); *H04W 8/08* (2013.01); *H04W 48/16* (2013.01); *H04W 48/18* (2013.01)

(58) Field of Classification Search
CPC ... H04W 28/0268; H04W 8/08; H04W 48/16; H04W 48/18; H04M 15/66
See application file for complete search history.

(56) References Cited

U.S. PATENT DOCUMENTS 10,142,889 B2 * 11/2018 Dao .................... H04L 41/5009
10,728,882 B2 * 7/2020 Wang .................... H04L 5/0092
(Continued)

FOREIGN PATENT DOCUMENTS

CN 105516952 A 4/2016
CN 107396401 A 11/2017
(Continued)

OTHER PUBLICATIONS

3GPP TS 29.512 V0.5.0, Apr. 2018, "3rd Generation Partnership Project; Technical Specification Group Core Network and Terminals; 5G System; Session Management Policy Control Service; Stage 3 (Release 15)," 42 pages.
(Continued)

*Primary Examiner* — Julio R Perez
(74) *Attorney, Agent, or Firm* — Conley Rose, P.C.

(57) ABSTRACT

A method includes: receiving, by a session management function (SMF), first information from an access and mobility management function (AMF); obtaining, by the SMF, protocol data unit (PDU) session management subscription information from a unified data management (UDM) module; and when dynamic policy and charging control (PCC) is not deployed, establishing, by the SMF based on the first information and at least one of the PDU session management subscription information or local PDU session policy information of the SMF, a default guaranteed bit rate (GBR) quality of service (QoS) flow in the PDU session.

29 Claims, 11 Drawing Sheets

Related U.S. Application Data continuation of application No. PCT/CN2019/087729, filed on May 21, 2019.

(51) Int. Cl.
*H04W 28/02* (2009.01)
*H04W 48/16* (2009.01)
*H04W 48/18* (2009.01)

(56) References Cited

U.S. PATENT DOCUMENTS

| | | | | |
|---|---|---|---|---|
| 10,779,254 | B2* | 9/2020 | Lee | H04L 47/821 |
| 10,791,431 | B2* | 9/2020 | Livanos | H04W 4/08 |
| 11,109,280 | B2* | 8/2021 | Youn | H04W 76/11 |
| 11,323,386 | B2* | 5/2022 | Dannebro | H04W 36/0022 |
| 11,330,642 | B2* | 5/2022 | Kim | H04W 68/005 |
| 11,350,405 | B2* | 5/2022 | Pawlak | H04W 72/27 |
| 11,477,689 | B2* | 10/2022 | Wei | H04W 48/18 |
| 11,533,401 | B2* | 12/2022 | Qiao | H04M 15/66 |
| 2010/0081444 | A1* | 4/2010 | Jin | H04W 76/32 455/450 |
| 2019/0207778 | A1* | 7/2019 | Qiao | H04W 76/10 |
| 2019/0364541 | A1 | 11/2019 | Ryu | |
| 2020/0077315 | A1* | 3/2020 | Jin | H04W 36/1443 |
| 2020/0154379 | A1* | 5/2020 | Huang-Fu | H04W 48/18 |
| 2020/0389811 | A1* | 12/2020 | Guo | H04W 76/20 |
| 2021/0022024 | A1* | 1/2021 | Yao | H04W 36/0085 |
| 2021/0076252 | A1* | 3/2021 | Wei | H04M 15/66 |
| 2021/0195490 | A1* | 6/2021 | Rommer | H04W 36/14 |
| 2021/0282038 | A1* | 9/2021 | Li | H04W 24/08 |
| 2021/0345159 | A1* | 11/2021 | Prabhakar | H04W 76/16 |
| 2021/0400538 | A1* | 12/2021 | Ke | H04L 45/302 |
| 2022/0022089 | A1* | 1/2022 | Zhu | H04W 56/001 |

FOREIGN PATENT DOCUMENTS

| | | |
|---|---|---|
| EP | 2443865 A1 | 4/2012 |
| WO | 2010145717 A1 | 12/2010 |
| WO | 2018008980 A1 | 1/2018 |

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 8)," 33GPP TS 23.401 V8.18.0, Technical Specification, Mar. 2013, 238 pages.

3GPP TS 23.401 V0.5.1, May 2007, "3rd Generation Partnership Project; Technical Specification Group Services and System Aspects; GPRS enhancements for E-UTRAN access; Release 8," 50 pages.

3GPP TS 23.501 V15.1.0, "3rd Generation Partnership Project; Technical Specification Group Services and System Aspects; System Architecture for the 5G System; Stage 2 (Release 15)," Mar. 2018, 201 pages.

3GPP TS 23.502 V15.1.0, 3rd Generation Partnership Project; Technical Specification Group Services and System Aspects; Procedures for the 5G System; Stage 2 (Release 15), Mar. 2018, 285 pages.

Huawei, et al., "Correction on Notification Control for GBR QoS flow," 3GPP TSG-SA WG2 Meeting #125, 62-181193, Gothenburg, Sweden, Jan. 22-26, 2018, 4 pages.

Huawei, et al., "Correction on Notification Control for GBR QoS flow," 3GPP TSG-SA2 Meeting #126, S2-181569 (revision of S2-180309), Montreal, Canada, Feb. 26-Mar. 2, 2018, 12 pages.

Oppo, China Unicom, China Telecom, Adding PRA related description in 23.502. SA WG2 Meeting #124, Nov. 27-Dec. 1, 2017, Reno, Nevada, USA, S2-179578, 20 pages.

IPWireless, Nextwave, Default and dedicated bearers. 3GPP TSG SA WG2 Architecture S2#58, Jun. 25-29, 2007, Orlando, USA, S2-072492, 3 pages.

* cited by examiner

METHOD AND APPARATUS FOR ESTABLISHING GUARANTEED BIT RATE (GBR) QUALITY OF SERVICE (QoS) FLOW IN SESSION

CROSS-REFERENCE TO RELATED APPLICATIONS

This application is a continuation of U.S. patent application Ser. No. 17/100,367, filed on Nov. 20, 2020, which is a continuation of International Patent Application No. PCT/CN2019/087729, filed on May 21, 2019, which claims priority to Chinese Patent Application No. 201810489265.0, filed on May 21, 2018. All of the aforementioned applications are hereby incorporated by reference in their entireties.

TECHNICAL FIELD

This application relates to the field of communications technologies, and more For example, to a method and an apparatus for establishing a guaranteed bit rate (GBR) quality of service (QoS) flow in a session.

BACKGROUND

To transmit service data between a user equipment (UE) and a data network (DN), a protocol data unit (PDU) session usually needs to be established between the UE and a network device, and one or more QoS flows are established in the PDU session to schedule services with different QoS requirements in the same session.

Specifically, in a conventional solution, a default non-GBR QoS flow is established in a PDU session of UE, and then one or more non-default GBR QoS flows or non-GBR QoS flows are established based on a service requirement of the UE. In other words, in addition to the default GBR QoS flow, other QoS flows exist in the PDU session. Therefore, in a process of transmitting service data, classification is performed on the UE and an access network device according to a specified rule, and QoS flow identifier (QFI) marking is performed. Such a processing procedure causes many processing delays, and how to reduce these delays is a problem to be resolved.

SUMMARY

This application provides a method and an apparatus for establishing a GBR QoS flow in a session, to reduce a delay of transmitting service data using the GBR QoS flow.

According to a first aspect, a method for establishing a GBR QoS flow in a session is provided. The method includes receiving, by a session management function (SMF), first information from an access and mobility management function (AMF), where the first information includes establishment request information of a PDU session from a terminal device, obtaining, by the SMF, PDU session management subscription information from a unified data management (UDM) module, and establishing, by the SMF based on the first information, a default GBR QoS flow in the PDU session.

Optionally, when dynamic policy and charging control (PCC) is deployed, the SMF obtains PDU session policy information from a policy control function (PCF), and the establishing, by the SMF based on the first information, a default GBR QoS flow in the PDU session includes establishing, by the SMF based on the first information and at least one of the PDU session management subscription information or the PDU session policy information, the default GBR QoS flow in the PDU session of the SMF.

Alternatively, when dynamic PCC is not deployed, the SMF establishes, based on the first information and at least one of the PDU session management subscription information or local PDU session policy information of the SMF, the default GBR QoS flow in the PDU session.

In this application, the local PDU session policy information is stored in the SMF, while the PDU session policy information is obtained from the PCF.

It should be understood that after receiving the first information, the SMF may first establish the PDU session for the terminal device, and then establish the default GBR QoS flow in the PDU session. In addition, the default GBR QoS flow may be a GBR QoS flow that is established at an initial stage of PDU session establishment according to a default QoS rule and that always exists in a life cycle of the PDU session.

Before sending the first information to the SMF, the AMF may receive an establishment request message of the PDU session sent by the terminal device, generate the first information based on the establishment request message of the PDU session, and then send the first information to the SMF. When there are multiple available SMFs around the AMF, the AMF may further select one SMF, and then send the first information to the selected SMF.

In this application, after receiving the first information sent by the AMF, the SMF can directly establish the default GBR QoS flow based on related information, such that time required for establishing a GBR QoS flow can be reduced when the GBR QoS flow is needed for transmitting data.

Optionally, the terminal device is a device that supports an ultra-reliable low-latency connection (URLLC) service.

Further, the terminal device may be a device that includes only a URLLC service.

In some implementations, the first information includes second information, and the second information is at least one of a subscription permanent identifier (SUPI), a data network name (DNN), single network slice selection assistance information (S-NSSAI), service indication information, a default GBR QoS flow indication, QoS index information, or QoS parameter information.

Optionally, the second information may be any combination of the SUPI, the DNN, the S-NSSAI, the service indication information, the default GBR QoS flow indication, the QoS index information, and the QoS parameter information.

The second information may indicate that the default GBR QoS flow is to be established in the PDU session.

The second indication information can be used to determine that the default GBR QoS flow needs to be established in the PDU session.

In some implementations, when the dynamic PCC is deployed, the method further includes obtaining, by the SMF, the PDU session management subscription information from the UDM.

Optionally, the obtaining, by the SMF, the PDU session management subscription information from the UDM includes sending, by the SMF, a subscription information request message to the UDM, where the subscription information request message carries the second information, and receiving, by the SMF, the PDU session management subscription information sent by the UDM, where the PDU session management subscription information includes subscription information of the default GBR QoS flow, and the subscription information of the default GBR QoS flow includes a 5th generation (5G) QoS identifier (5QI), an allocation and retention priority (ARP), a guaranteed flow bit rate (GFBR), and a maximum flow bit rate (MFBR).

The second information may be used to indicate the UDM to send, to the SMF, the PDU session management subscription information that includes the subscription information of the default GBR QoS flow.

In some implementations, that the SMF obtains PDU session policy information from a PCF includes sending, by the SMF, a policy information request message to the PCF, where the policy information request message carries the second information, and receiving, by the SMF, the PDU session policy information sent by the PCF, where the PDU session policy information includes a default QoS rule, and the default QoS rule includes a 5QI, an ARP, a GFBR, and a MFBR of the default GBR QoS flow.

The second information may indicate the PCF to send, to the SMF, the PDU session policy information that includes the policy information of the default GBR QoS flow.

In some implementations, the SMF rejects a request for establishing a non-GBR QoS flow in the PDU session.

After the default GBR QoS flow is established, a non-GBR QoS flow is no longer established, but another GBR QoS flow can be established in the PDU session.

In this application, the request for establishing a non-GBR QoS flow is rejected, such that only a GBR QoS flow can be established in the PDU, and a requirement of some specific services (for example, a URLLC service) for transmitting data can be met.

In some implementations, the default GBR QoS flow includes a time-sensitive GBR QoS flow.

The time-sensitive GBR QoS flow may be used to transmit time-sensitive service data. For example, the time-sensitive GBR QoS flow may be used to transmit service data of the URLLC service.

According to a second aspect, a method for establishing a GBR QoS flow in a session is provided. The method includes receiving, by a UDM module, a subscription information request message from a SMF, where the subscription information request message is used to request to obtain PDU session management subscription information from the UDM, and the session subscription information includes subscription information of a default GBR QoS flow, and sending, by the UDM, the subscription information of the default GBR QoS flow to the SMF, where the subscription information of the default GBR QoS flow is used to establish the default GBR QoS flow.

In some implementations, the subscription information of the default GBR QoS flow includes a 5QI, an ARP, a GFBR, and a MFBR.

After receiving the subscription information request message, the UDM can send the subscription information of the default GBR QoS flow to the SMF, such that the SMF can directly establish the default GBR QoS flow in the PDU session by referring to the subscription information of the default GBR QoS flow, thereby reducing time required for establishing the GBR QoS flow.

According to a third aspect, a method for establishing a GBR QoS flow in a session is provided. The method includes receiving, by a UDM module, a subscription information request message from a SMF, where the subscription information request message includes second information, and the second information is at least one of a SUPI, a DNN, S-NSSAI, service indication information, a default GBR QoS flow indication, QoS index information, or QoS parameter information, and sending, by the UDM based on the second information, subscription information of a default GBR QoS flow to the SMF, where the subscription information of the default GBR QoS flow is used to establish the default GBR QoS flow.

In some implementations, the subscription information of the default GBR QoS flow includes a 5QI, an ARP, a GFBR, and a MFBR.

After receiving the second information, the UDM determines to send the subscription information of the default GBR QoS flow to the SMF, such that the SMF can directly establish the default GBR QoS flow in the PDU session by referring to the subscription information of the default GBR QoS flow after receiving the subscription information of the default GBR QoS flow, thereby reducing time required for establishing the GBR QoS flow.

According to a fourth aspect, a method for establishing a GBR QoS flow in a session is provided. The method includes receiving, by a PCF module, a policy information request message from a SMF, where the policy information request message is used to request to obtain PDU session policy information from the PCF, and the PDU session policy information includes policy information of a default GBR QoS flow, and sending, by the PCF, the policy information of the default GBR QoS flow to the SMF, where the policy information of the default GBR QoS flow is used to establish the default GBR QoS flow.

In some implementations, the subscription information of the default GBR QoS flow includes a 5QI, an ARP, a GFBR, and a MFBR.

After receiving the policy information request message, the PCF can send the policy information of the default GBR QoS flow to the SMF, such that the SMF can directly establish the default GBR QoS flow in the PDU session by referring to the policy information of the default GBR QoS flow, thereby reducing time required for establishing the GBR QoS flow.

According to a fifth aspect, a method for establishing a GBR QoS flow in a session is provided. The method includes receiving, by a PCF entity, a policy information request message from a SMF, where the policy information request message includes second information, and the second information is at least one of a SUPI, a DNN, S-NSSAI, service indication information, QoS index information, QoS parameter information, or session subscription information, determining, by the PCF, whether policy information of a GBR QoS flow corresponding to the second information is policy information of a default GBR QoS flow, and if the policy information of the GBR QoS flow corresponding to the second information is the policy information of the default GBR QoS flow, sending, by the PCF, the policy information of the default GBR QoS flow to the SMF.

In some implementations, the subscription information of the default GBR QoS flow includes a 5QI, an ARP, a GFBR, and a MFBR.

After receiving the second information, the PCF determines to send the policy information of the default GBR QoS flow to the SMF, such that the SMF can directly establish the default GBR QoS flow in the PDU session by referring to the policy information of the default GBR QoS flow after receiving the policy information of the default GBR QoS flow, thereby reducing time required for establishing the GBR QoS flow.

According to a sixth aspect, a method for establishing a GBR QoS flow in a session is provided. The method includes generating, by a terminal device, an establishment request message of a PDU session, where the establishment request message of the PDU session includes first indication information, and the first indication information is used to indicate that a default GBR QoS flow is to be established in the PDU session, and sending, by the terminal device, the establishment request message of the PDU session to a SMF, to establish a PDU session that includes the default GBR QoS flow.

By sending, to the AMF, the establishment request message of the PDU session including the first indication information, the terminal device can request the SMF to directly establish the default GBR QoS flow in the PDU session, thereby reducing time required for establishing the GBR QoS flow.

In some implementations, the first indication information includes at least one of service indication information, QoS index information, or QoS parameter information.

In some implementations, the method further includes rejecting, by the terminal device, a message for establishing a non-GBR QoS flow in the PDU session from the SMF.

In this application, a request for establishing a non-GBR QoS flow is rejected, such that only a GBR QoS flow can be established in the PDU, and a requirement of some specific services (for example, a URLLC service) for transmitting data can be met.

In some implementations, the default GBR QoS flow includes a time-sensitive GBR QoS flow.

According to a seventh aspect, an apparatus for establishing a GBR QoS flow in a session is provided. The apparatus includes a module configured to perform the method in any one of the first aspect to the fifth aspect.

For example, the apparatus may be a network side device or a network device.

According to an eighth aspect, a terminal device is provided. The terminal device includes a module configured to perform the method according to the sixth aspect.

According to a ninth aspect, a computer-readable storage medium is provided. The computer-readable storage medium stores an instruction. When the instruction is run on a computer, the computer is enabled to perform the method according to any one of the first to the sixth aspects.

According to a tenth aspect, a computer program product including an instruction is provided. When the computer program product is run on a computer, the computer is enabled to perform the method according to any one of the first aspect to the sixth aspect.

DESCRIPTION OF EMBODIMENTS

The following describes technical solutions of this application with reference to accompanying drawings.

The technical solutions in embodiments of this application may be applied to a 4th generation (4G) system, a future 5G system, a new radio (NR) system, and a system that has an architecture similar to that of the 5G system.

The terminal device in the embodiments of this application may also be referred to as a UE, an access terminal, a subscriber unit, a subscriber station, a mobile station, a mobile console, a remote station, a remote terminal, a mobile device, a user terminal, a terminal, a wireless communication device, a user agent, a user apparatus, or the like. The terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application.

For example, the terminal device in the embodiments of this application may be a device with a URLLC service.

Figure 1:
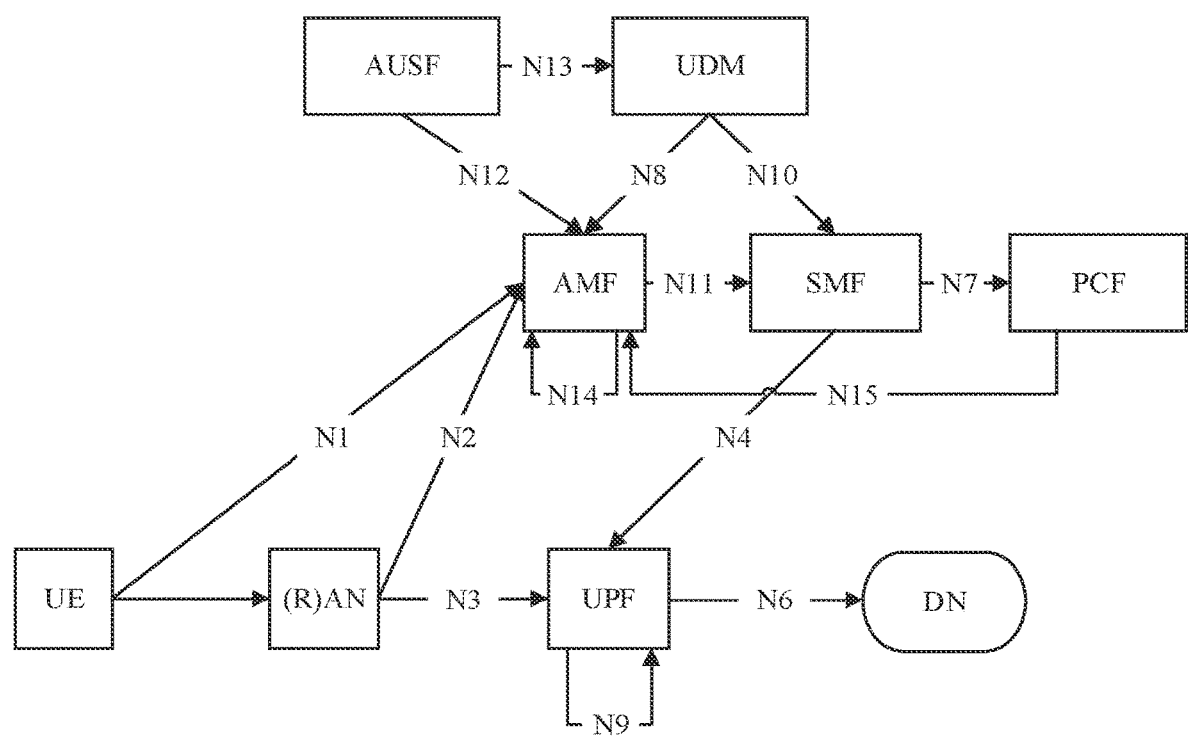
FIG. 1 is a schematic diagram of an architecture of a 5G system in a non-roaming scenario.

The technical solutions in the embodiments of this application may be applied to a 5G system in a non-roaming scenario. Referring to FIG. 1, the 5G system in the non-roaming scenario is described as follows.

FIG. 1 is a schematic diagram of an architecture of a 5G system in a non-roaming scenario.

The system architecture shown in FIG. 1 includes UE, a radio access network (RAN), an AMF, a SMF, a user plane function (UPF) network element, a PCF, a UDM network element, an authentication server (AUSF) module, and a DN module.

Main functions of devices in a core network in the system architecture shown in FIG. 1 are as follows.

The AMF is responsible for access and mobility management, including functions such as user authentication, handover, and location update, the SMF is responsible for session management, including establishment, modification, and release of a PDU session, the PCF is responsible for user policy management, including a mobility-related policy and a PDU session-related policy, such as a QoS policy and a charging policy, the UPF is responsible for forwarding user data, the UDM stores subscription data of a user, the AUSF has an authentication and authorization service function and is responsible for authenticating and authorizing UE access, and the DN is a destination that a user's PDU session accesses.

It should be understood that, in addition to the 5G system in the non-roaming scenario shown in FIG. 1, the technical solutions in the embodiments of this application may be applied to another system architecture. For example, the technical solutions in the embodiments of this application may also be applied to the 5G system in a roaming scenario.

In a conventional solution, when a URLLC service exists, to transmit data of the URLLC service, a GBR QoS flow needs to be created in a PDU session. In this case, two signaling exchange processes are required. One is a PDU session establishment process, and the other is a session modification process. This causes a delay and unnecessary establishment of a default non-GBR QoS flow. Therefore, to reduce the delay of establishing a GBR QoS flow, in this application, a default GBR QoS flow is directly established in a PDU session, in order to meet a requirement for transmitting the data of the URLLC service.

Figure 2:
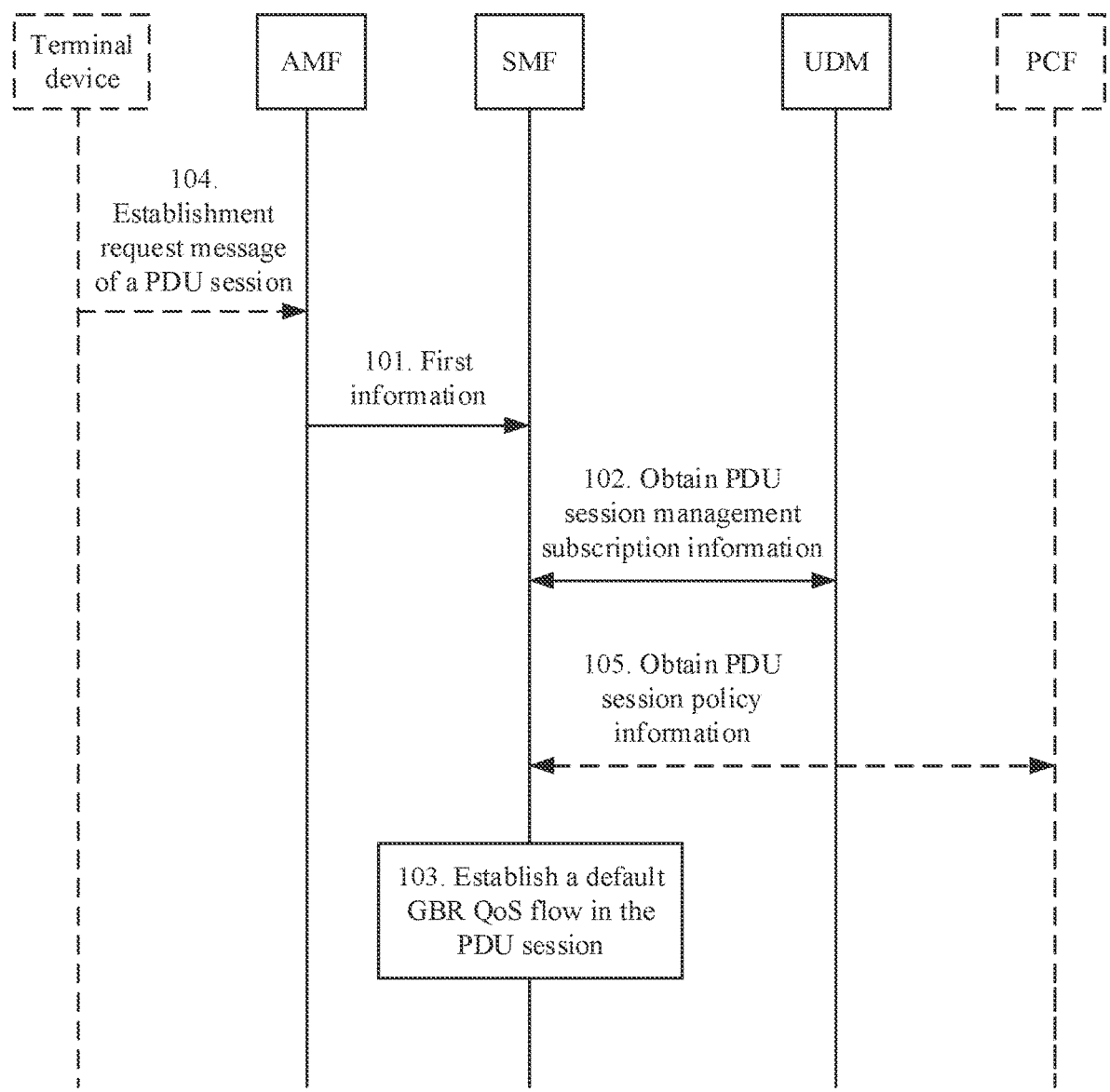
FIG. 2 is a schematic flowchart of a method for establishing a GBR QoS flow in a session according to an embodiment of this application.

Referring to FIG. 2, a method for establishing a GBR QoS flow in a session according to an embodiment of this application is described in detail as follows.

FIG. 2 is a schematic flowchart of a method for establishing a GBR QoS flow in a session according to an embodiment of this application. The method shown in FIG. 2 may be performed by a SMF. The method shown in FIG. 2 includes step 101 to step 103. Step 101 to step 103 are described in detail separately below.

Step 101. An SMF receives first information from an AMF.

The first information may be generated by the AMF based on an establishment request message of a PDU session after the AMF receives the establishment request message of the PDU session of a terminal device, and the first information includes the establishment request message of the PDU session of the terminal device. The first information may be used to request the SMF to establish a PDU session for the terminal device.

As shown in FIG. 2, before step 101, the method shown in FIG. 2 may further include step 104. Step 104 is that the AMF receives the establishment request message of the PDU session sent by the terminal device.

After receiving the establishment request message of the PDU session, the AMF may generate the first information based on the establishment request message of the PDU session, and then send the first information to the SMF.

In addition, when sending the establishment request message of the PDU session to the AMF, the terminal device may first send the establishment request message of the PDU session to a RAN, and then the RAN forwards the establishment request message of the PDU session to the AMF. When forwarding the establishment request message of the PDU session to the AMF, the RAN may further forward some other information of the terminal device, for example, location information of the terminal device, to the AMF.

Alternatively, the first information includes second information, and the second information is at least one of a SUPI, a DNN, S-NSSAI, service indication information, a default GBR QoS flow indication, QoS index information, or QoS parameter information.

The SPUI, the DNN, and the S-NSSAI may be information added by the AMF based on the PDU session request message after the AMF receives the PDU session request message, and the service indication information, the QoS index information and the QoS parameter information may be carried in PDU session request information sent by the terminal device.

The service indication information may be URLLC service indication information (URLLC indication). When a service indicated by the service indication information is a URLLC service, the service indication information may be used to indicate the SMF to establish a default GBR QoS flow in the PDU session.

Compared with the foregoing manner in which the service indication information indirectly indicates, using a specific service type (for example, a URLLC service), to establish the default GBR QoS flow in the PDU session, the default GBR QoS flow indication may directly indicate the SMF to establish the default GBR QoS flow in the PDU session.

The service indication information and the default GBR QoS flow indication may be included in a UE route selection policy (URSP). For example, if the service indication information is URLLC service indication information or the default GBR QoS flow indication, parameters included in the URSP are those shown in Table 1.

TABLE 1

| Information item | Description | Type | Allows a PCF to modify a URSP | Scope |
|---|---|---|---|---|
| Route selection descriptor priority | Determines an applying sequence of route selection descriptors. | Mandatory | Yes | UE context |
| Route selection component | Defines a route selection component. | Mandatory | | |
| Session and service continuity (SSC) mode selection | A single value for an SSC mode. | Optional | Yes | UE context |
| Network slice selection | A single value or a list of S-NSSAI values. | Optional | Yes | UE context |
| DNN selection | A single value or a list of DNN values. | Optional | Yes | UE context |
| Non-seamless offload indication | Indicates whether traffic of a matching application is to be offloaded to non-3rd Generation Partnership Project (3GPP) access outside of a PDU session. | Optional | Yes | UE context |

TABLE 1-continued

| Information item | Description | Type | Allows a PCF to modify a URSP | Scope |
| --- | --- | --- | --- | --- |
| Access type preference | Indicates a preferred access type (3GPP or non-3GPP) when UE establishes a PDU session for a matching application. | Optional | Yes | UE context |
| URLLC parameter/ Default GBR QoS flow indication | Indicates whether a matching application is a URLLC service or whether a matching application is to be connected to a GBR session. | Optional | Yes | UE context |

As shown in Table 1, the URLLC parameter/default GBR QoS flow indication included in the URSP may indicate the service indication information, and a value of the URLLC parameter/default GBR QoS flow indication may be used to indicate whether to establish the default GBR QoS flow in the PDU session.

For example, when the URLLC parameter/default GBR QoS flow indication corresponds to one bit, if a value of the bit is 0, it indicates that the default GBR QoS flow does not need to be established in the PDU session, or if a value of the bit is 1, it indicates that the default GBR QoS flow needs to be established in the PDU session (that is, the SMF is indicated to establish the default GBR QoS flow in the PDU).

It should be understood that there may be a correspondence between the QoS index information and a resource type, information about the correspondence between the QoS index information and the resource type may be stored in the SMF, and the correspondence between the QoS index information and the resource type may be that shown in Table 2.

Step 102. The SMF obtains PDU session management subscription information from a UDM.

Optionally, that the SMF obtains PDU session management subscription information from a UDM includes sending, by the SMF, a subscription information request message to the UDM, where the subscription information request message carries the second information, and receiving, by the SMF, the PDU session management subscription information sent by the UDM, where the PDU session management subscription information includes subscription information of the default GBR QoS flow, and the subscription information of the default GBR QoS flow includes a 5QI, an ARP, a GFBR, and a MFBR.

It should be understood that, because the first information received by the SMF includes the session establishment request message, the SMF is triggered to request to obtain the PDU session management subscription information from the UDM for session establishment.

Step 103. The SMF establishes the default GBR QoS flow in the PDU session.

It should be understood that in the 5G system, the default GBR QoS flow may be a GBR QoS flow that is established

TABLE 2

| QoS index | 5QI value | Resource type | Default priority | Packet delay budget | Packet error rate | Default maximum data burst volume | Default averaging window | Example service |
| --- | --- | --- | --- | --- | --- | --- | --- | --- |
| X | 10 | Delay-critical GBR | 11 | 5 milliseconds (ms) | $10^{-5}$ | 160 bytes (B) | To be determined (TBD) | Remote control |
| Y | 11 | | 12 | 10 ms | $10^{-5}$ | 320 B | TBD | Intelligent Transportation System |
| Z | 12 | | 13 | 20 ms | $10^{-5}$ | 640 B | TBD | |
| M | 16 | | 18 | 10 ms | $10^{-4}$ | 255 B | TBD | Discrete automation |
| N | 12 | | 19 | 10 ms | $10^{-4}$ | 1358 B | TBD | Discrete automation |

It should be understood that when the first information includes the QoS index information, the SMF may parse the first information to obtain the QoS index information. Next, the SMF may determine, based on the QoS index information, whether to establish the default GBR QoS flow in the PDU session. As shown in Table 2, when an index value indicated by the QoS index information is any one of X, Y, Z, M, and N, a resource type corresponding to the QoS index information is the delay-critical GBR, the SMF determines to establish the default GBR QoS flow in the PDU session.

at an initial stage of PDU session establishment according to default QoS and that always exists in a life cycle of the PDU session.

Based on whether dynamic PCC is deployed, the SMF establishes the default GBR QoS flow in the PDU session in either of the following cases.

Case 1. The dynamic PCC is deployed.

In case 1, because the dynamic PCC is deployed, the SMF may obtain PDU session policy information from the UDM, and may refer to the PDU session policy information when establishing the default GBR QoS flow in the PDU session.

Therefore, when the dynamic PCC is deployed, the method shown in FIG. 2 further includes step 105.

Step 105 is that the SMF obtains the PDU session policy information from the PCF.

Optionally, that the SMF obtains the PDU session policy information from the UDM includes sending, by the SMF, a policy information request message to the PCF, where the policy information request message carries the second information, and receiving, by the SMF, the PDU session policy information sent by the PCF, where the PDU session policy information includes a default QoS rule, and the default QoS rule includes the 5QI, the ARP, the GFBR, and the MFBR of the default GBR QoS flow.

After obtaining the PDU session policy information, the SMF establishes the default GBR QoS flow in the PDU session.

That the SMF establishes the default GBR QoS flow in the PDU session includes establishing, by the SMF based on the first information and at least one of the PDU session management subscription information or the PDU session policy information, the default GBR QoS flow in the PDU session.

It should be understood that the PDU session is a session established by the SMF for the terminal device.

For example, in case 1, that the SMF establishes the default GBR QoS flow in the PDU session includes the following three implementations (1) Establishing, based on the first information and the PDU session management subscription information, the default GBR QoS flow in the PDU session (2) Establishing, based on the first information and the PDU session policy information, the default GBR QoS flow in the PDU session (3) Establishing, based on the first information, the session management policy information, and PDU session policy information, the default GBR QoS flow in the PDU session Case 2. The dynamic PCC is not deployed.

In case 2, because the dynamic PCC is not deployed, the SMF cannot obtain the PDU session policy information from the UDM. In other words, the SMF cannot refer to the PDU session policy information when establishing the default GBR QoS flow in the PDU session. Because the SMF stores local PDU session policy information, the SMF can refer to the local PDU session policy information when establishing the default GBR QoS flow in the PDU session.

Therefore, when the dynamic PCC is not deployed, that the SMF establishes the default GBR QoS flow in the PDU session includes establishing, by the SMF based on the first information and at least one of the PDU session management subscription information or the local PDU session policy information, the default GBR QoS flow in the PDU session.

For example, in case 1, that the SMF establishes the default GBR QoS flow in the PDU session includes the following three implementations (4) Establishing, by the SMF based on the first information and the PDU session management subscription information, the default GBR QoS flow in the PDU session (5) Establishing, by the SMF based on the first information and the local PDU session policy information, the default GBR QoS flow in the PDU session (6) Establishing, by the SMF based on the first information, the session management policy information, and the local session policy information, the default GBR QoS flow in the PDU session A mechanism in which the SMF establishes the default GBR QoS flow in the PDU session based on the first information and other information after receiving the first information is described below.

The first information includes the session establishment request message. Therefore, after the SMF receives the first information, the first information triggers the SMF to request to obtain the PDU session management subscription information from the UDM for session establishment. Similarly, the first information may further trigger the SMF to request to obtain the PDU session policy information from the PCF for session establishment.

The PDU session management subscription information obtained by the SMF from the UDM may be provided to the PCF when the SMF requests to obtain the PDU session policy information from the PCF.

When the PDU session management subscription information provided by the UDM is inconsistent with the PDU session policy information provided by the PCF, the PDU session policy information may overwrite the PDU session management subscription information, in other words, the PDU session policy information is used.

When the SMF provides the PDU session management subscription information obtained from the UDM to the PCF when the SMF requests to obtain the PDU session policy information from the PCF, the PCF may determine whether the PDU session policy information is inconsistent with the PDU session management subscription information. If the PDU session policy information is inconsistent with the PDU session management subscription information, the PDU session policy information is used. When the SMF does not provide the PDU session management subscription information obtained from the UDM to the PCF when the SMF requests to obtain the PDU session policy information from the PCF, the SMF determines whether the PDU session policy information is inconsistent with the PDU session management subscription information. If the PDU session policy information is inconsistent with the PDU session management subscription information, the PDU session policy information is used.

For example, if the PDU session management subscription information obtained by the SMF from the UDM includes a default non-GBR QoS parameter, and the PDU session policy information obtained from the PCF includes a default GBR QoS parameter, then the SMF establishes, based on the first information and the default GBR QoS parameter that is included in the PDU session policy information obtained from the PCF, the default GBR QoS flow in the PDU session.

Alternatively, if the PDU session management subscription information obtained by the SMF from the UDM includes default GBR QoS parameters A1, B1, C1, and D1, and the PDU session policy information obtained from the PCF includes default GBR QoS parameters A2, B2, C2, and D2, then the SMF establishes, based on the first information and the default GBR QoS parameters A2, B2, C2, and D2 that are included in the PDU session policy information obtained from the PCF, the default GBR QoS flow in the PDU session. The GBR QoS parameters are A2, B2, C2, and D2. The GBR QoS parameters A1, B1, C1, and D1 can be the same as or different from A2, B2, C2, and D2. If they are different, the session policy information provided by the PCF is used.

Optionally, in an embodiment, the method shown in FIG. 2 further includes. The SMF rejects a request for establishing a non-GBR QoS flow in the PDU session.

That the SMF rejects a request for establishing a non-GBR QoS flow in the PDU session may be as follows. After receiving the request for establishing the non-GBR QoS flow, the SMF replies that the non-GBR QoS flow cannot be established in the PDU session or does not reply to the request.

The request for establishing the non-GBR QoS flow may be from the terminal device, the UDM, or the PCF.

Optionally, in an embodiment, the method shown in FIG. 2 further includes the SMF accepts a request for establishing a GBR QoS flow in the PDU session.

In other words, in this application, after the default GBR QoS flow is established, a non-GBR QoS flow is no longer established, but another GBR QoS flow can be established in the PDU session.

In this application, the request for establishing a non-GBR QoS flow is rejected, such that only a GBR QoS flow can be established in the PDU, and a requirement of some specific services (for example, a URLLC service) for transmitting data can be met.

Figure 3:
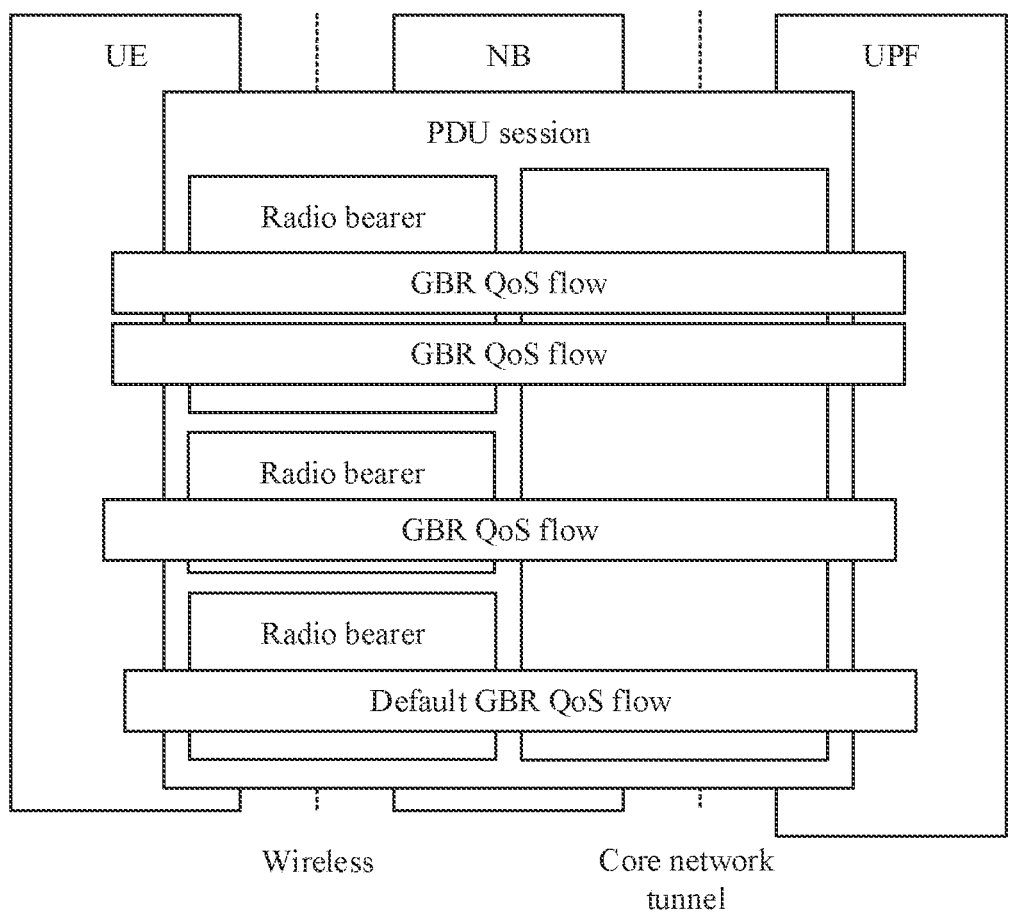
FIG. 3 is a schematic diagram of a GBR QoS flow in a PDU session.

As shown in FIG. 3, a PDU session is established between UE and a UPF, there is a radio bearer between the UE and a NodeB (NB), and there is a core network tunnel between the NB and the UPF. The PDU session includes a plurality of GBR QoS flows, and the plurality of GBR QoS flows include one default GBR QoS flow and a plurality of other GBR QoS flows.

Optionally, in an embodiment, the default GBR QoS flow includes a time-sensitive GBR QoS flow.

The time-sensitive GBR QoS flow may be used to transmit time-sensitive service data. For example, the time-sensitive GBR QoS flow may be used to transmit service data of the URLLC service.

Figure 4:
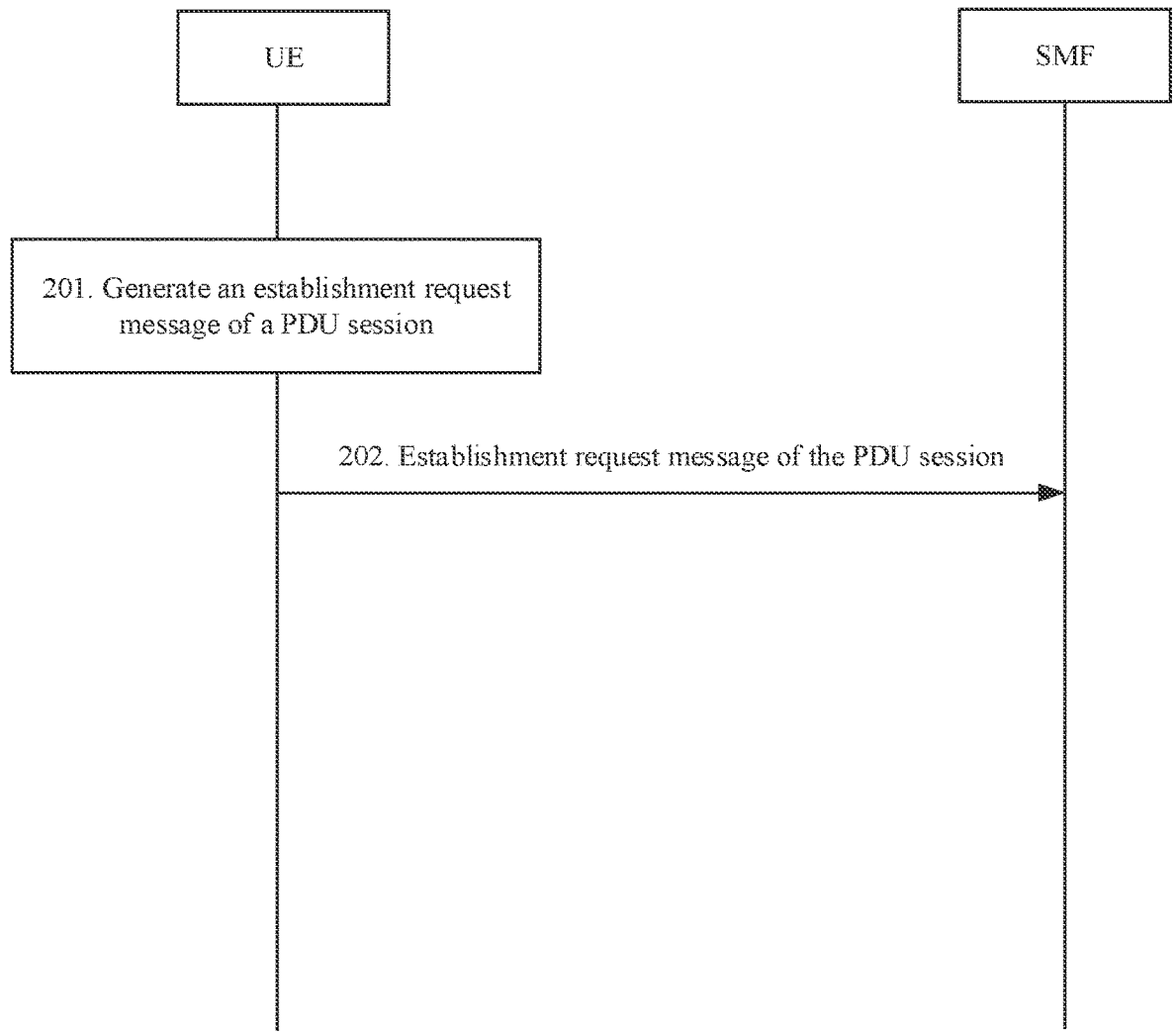
FIG. 4 is a schematic flowchart of a method for establishing a GBR QoS flow in a session according to an embodiment of this application.

The foregoing describes in detail the method for establishing the GBR QoS flow in the session in this embodiment of this application from a perspective of an SMF referring to FIG. 2 and FIG. 3. Referring to FIG. 4, a method for establishing a GBR QoS flow in a session in an embodiment of this application is described as follows from a perspective of a terminal device. The method shown in FIG. 4 may be performed by a terminal device, and the method shown in FIG. 4 includes step 201 and step 202. Step 201 and step 202 are described in detail separately as follows.

Step 201. A terminal device generates an establishment request message of a PDU session.

The establishment request message of the PDU session includes first indication information, and the first indication information is used to request to establish a PDU session that includes a default GBR QoS flow.

Step 202. The terminal device sends the establishment request message of the PDU session to an SMF.

When sending the establishment request message of the PDU session to the SMF, the terminal device may first send the establishment request message of the PDU session to an AMF, and then the AMF sends the establishment request message of the PDU session to the SMF.

Optionally, the default GBR QoS flow includes a time-sensitive GBR QoS flow.

In this application, by sending, to the AMF, the establishment request message of the PDU session including the first indication information, the terminal device can request the SMF to directly establish the default GBR QoS flow in the PDU session, thereby reducing time required for establishing the GBR QoS flow.

Optionally, the first indication information includes at least one of service indication information, QoS index information, or QoS parameter information.

The service indication information may be used to indicate a URLLC service. For content, refer to Table 1.

Optionally, the terminal device rejects a message for establishing a non-GBR QoS flow in the PDU session from the SMF.

It should be understood that in this application, the terminal device requests to establish only a GBR QoS flow in the PDU session, and does not establish a non-GBR QoS flow in the PDU session. In addition to the default GBR QoS flow, the GBR QoS flow established in the PDU session may further include another GBR QoS flow. In other words, in this application, a plurality of GBR QoS flows may be established in the PDU session. One GBR QoS flow is the default GBR QoS flow, and the other GBR QoS flows are non-default GBR QoS flows.

In this application, a request for establishing a non-GBR QoS flow is rejected, such that only a GBR QoS flow can be established in the PDU, and a requirement of some specific services (for example, a URLLC service) for transmitting data can be met.

Figure 5:
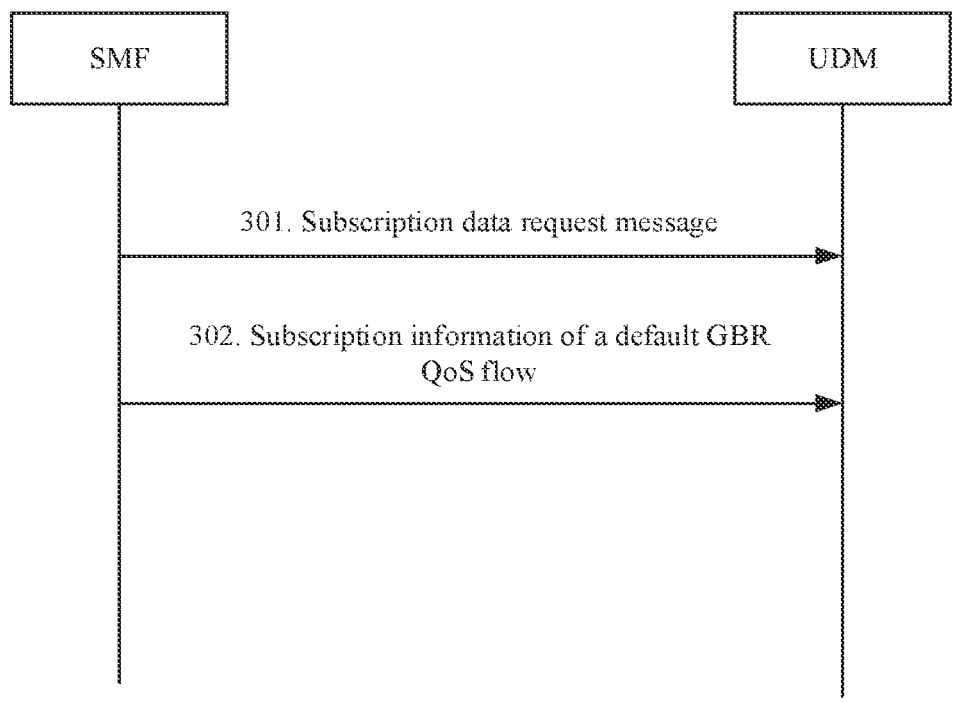
FIG. 5 is a schematic flowchart of a method for establishing a GBR QoS flow in a session according to an embodiment of this application.

The foregoing describes in detail the method for establishing the GBR QoS flow in the session in this embodiment of this application from the perspective of the terminal device referring to FIG. 4. Referring to FIG. 5, a method for establishing a GBR QoS flow in a session in an embodiment of this application is described as follows from a perspective of a UDM. The method shown in FIG. 5 may be performed by a UDM, and the method shown in FIG. 5 includes step 301 and step 302. Step 301 and step 302 are described in detail separately as follows.

Step 301. A UDM receives subscription information request message from an SMF.

Step 302. The UDM sends subscription information of a default GBR QoS flow to the SMF.

In this application, after receiving the subscription information request message, the UDM can send the subscription information of the default GBR QoS flow to the SMF, such that the SMF can directly establish the default GBR QoS flow in a PDU session by referring to the subscription information of the default GBR QoS flow, thereby reducing time required for establishing the GBR QoS flow.

Optionally, the subscription information of the default GBR QoS flow includes a 5QI, an ARP, a GFBR, and a MFBR.

For example, based on the subscription information of the default GBR QoS flow included in PDU session management subscription information that is stored in the UDM, there may be two cases in which the UDM sends the subscription information of the default GBR QoS flow to the SMF.

Case 1. The PDU session management subscription information stored in the UDM includes only the subscription information of the default GBR QoS flow.

In case 1, because the PDU session management subscription information stored in the UDM includes only the subscription information of the default GBR QoS flow, after receiving the subscription information request message from the SMF, the UDM may directly send the subscription information of the default GBR QoS flow to the SMF.

Case 2. The PDU session management subscription information stored in the UDM includes the subscription information of the default GBR QoS flow and subscription information of another GBR QoS flow.

In case 2, because the UDM stores subscription information of a plurality of GBR QoS flows, the subscription information request message sent by the SMF may further include second information, where the second information is at least one of an SUPI, a DNN, S-NSSAI, service indication information, QoS index information, or QoS parameter information.

Next, the UDM determines whether subscription data of a GBR QoS flow corresponding to the second information is subscription data of the default GBR QoS flow. When the subscription data of the GBR QoS flow corresponding to the second information is the subscription data of the default GBR QoS flow, the UDM sends the subscription information of the default GBR QoS flow to the SMF.

Figure 6:
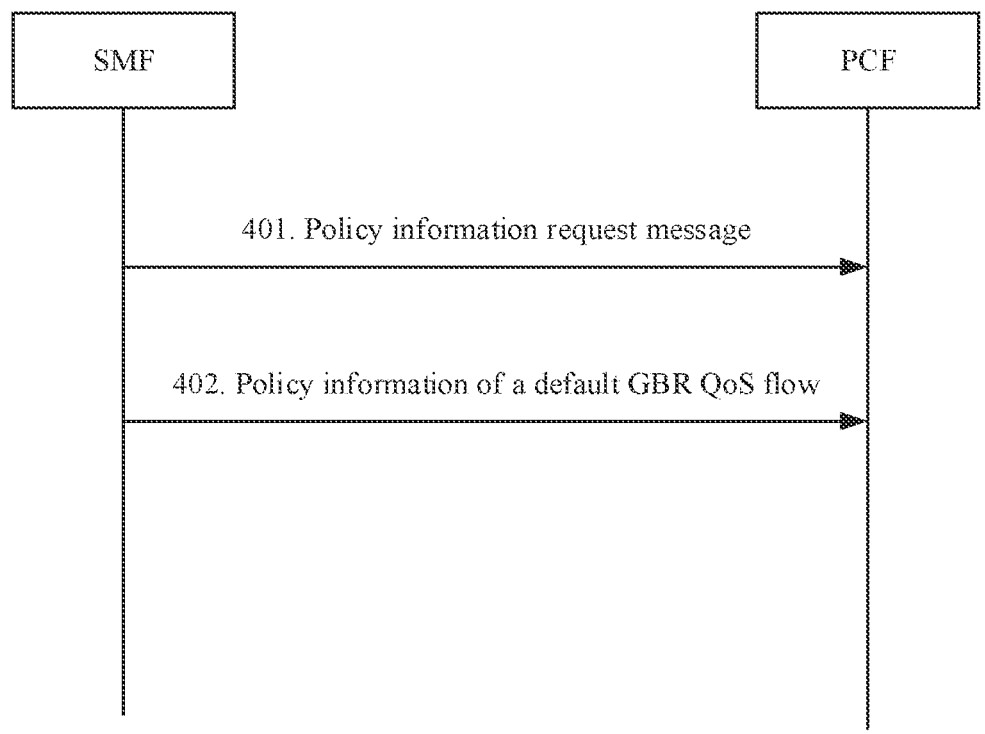
FIG. 6 is a schematic flowchart of a method for establishing a GBR QoS flow in a session according to an embodiment of this application.

The foregoing describes in detail the method for establishing the GBR QoS flow in the session in this embodiment of this application from the perspective of the UDM referring to FIG. 5. Referring to FIG. 6, a method for establishing a GBR QoS flow in a session in an embodiment of this application is described as follows from a perspective of a PCF. The method shown in FIG. 6 may be performed by a PCF, and the method shown in FIG. 6 includes step 401 and step 402. Step 401 and step 402 are described in detail separately as follows.

Step 401. A PCF receives policy information request message from an SMF.

Step 402. The PCF sends policy information of a default GBR QoS flow to the SMF.

In this application, after receiving the policy information request message, the PCF can send the policy information of the default GBR QoS flow to the SMF, such that the SMF can directly establish the default GBR QoS flow in a PDU session by referring to the policy information of the default GBR QoS flow, thereby reducing time required for establishing the GBR QoS flow.

Optionally, the subscription information of the default GBR QoS flow includes a 5QI, an ARP, a GFBR, and a MFBR.

For example, based on the policy information of the default GBR QoS flow included in session management policy information that is stored in the PCF, there may be two cases in which the PCF sends the policy information of the default GBR QoS flow to the SMF.

Case 1. The session management policy information stored in the PCF includes only the policy information of the default GBR QoS flow.

In case 1, because the session management policy information stored in the PCF includes only the policy information of the default GBR QoS flow, after receiving the policy information request message from the SMF, the PCF may directly send the policy information of the default GBR QoS flow to the SMF.

Case 2. The session management policy information stored in the PCF includes the policy information of the default GBR QoS flow and policy information of another GBR QoS flow.

In case 2, because the PCF stores the policy information of a plurality of GBR QoS flows, the policy information request message sent by the SMF may further include second information, where the second information is at least one of an SUPI, a DNN, S-NSSAI, service indication information, QoS index information, or QoS parameter information.

Next, the PCF determines whether policy information of a GBR QoS flow corresponding to the second information is the policy information of the default GBR QoS flow. When the policy information of the GBR QoS flow corresponding to the second information is the policy information of the default GBR QoS flow, the PCF sends the policy information of the default GBR QoS flow to the SMF.

Figure 7:
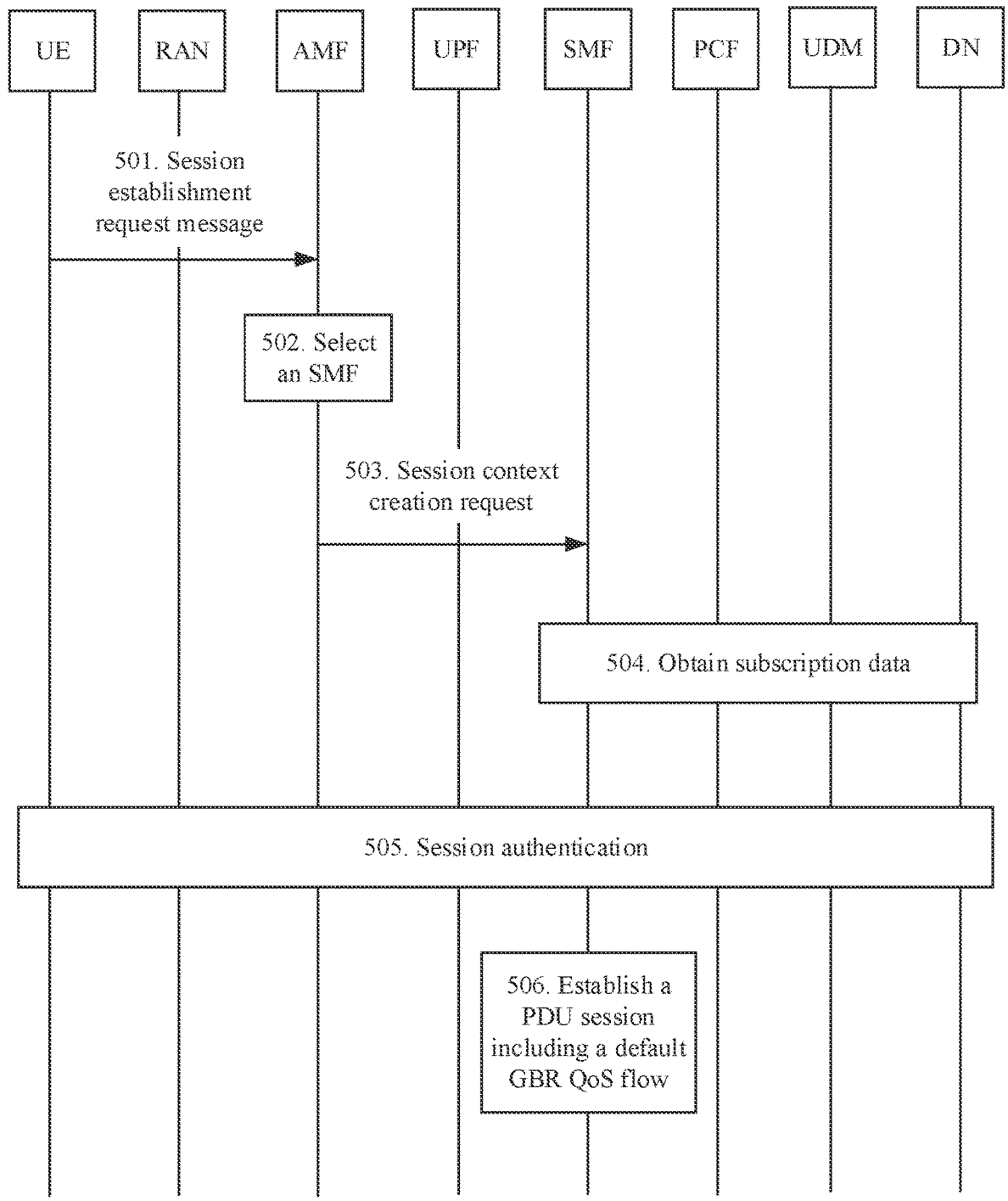
FIG. 7 is a schematic flowchart of a method for establishing a GBR QoS flow in a session according to an embodiment of this application.

Referring to FIG. 7, a process of establishing a GBR QoS flow in a session according to an embodiment of this application is described as follows.

FIG. 7 is a schematic flowchart for establishing a GBR QoS flow in a session according to an embodiment of this application. FIG. 7 shows an entire procedure for establishing a default GBR QoS flow, and the procedure includes step 501 to step 505. Step 501 to step 505 are described in detail as follows.

Step 501. UE sends a session establishment request message to an AMF.

For example, the session establishment request message may be an establishment request message of a PDU session, and the establishment request message may be used to request to establish the PDU session between the UE and a UPF.

In addition, the UE may send the establishment request message of the PDU session to the AMF over a RAN. For example, the UE may first send the session establishment request message to the RAN, and then the RAN forwards the establishment request message of the PDU session to the AMF. When forwarding the establishment request message of the PDU session to the AMF, the RAN may further forward other information, for example, location information of the UE, to the AMF.

The session establishment request message may include first information, where the first information is used to indicate that a default GBR QoS flow is to be established in the PDU session, and the first information may include at least one of a SUPI, a DNN, S-NSSAI, service indication information, QoS index information, or QoS parameter information.

Step 502. The AMF selects an SMF for the UE.

The AMF may select the SMF by itself, or the AMF may send an SMF discovery request to a network function repository function (NRF) and the NRF selects the SMF. When the SMF is selected, reference may be made to information such as the DNN, a network slice, subscription information, local PDU session policy information, and a load.

Step 503. The AMF sends a session context creation request to the SMF.

The context creation request is a PDU session context creation request, and the context creation request may include the session establishment request message sent by the UE to the AMF. Further, the context creation request may include the first information in the session establishment request message.

Step 504. The SMF obtains subscription data.

For example, the SMF may obtain PDU session subscription information from a UDM and obtain PDU session policy information from a PCF.

That the SMF obtains the PDU session subscription information from the UDM includes sending, by the SMF, a subscription information request message to the UDM, and receiving, by the SMF, the PDU session subscription information sent by the UDM.

That the SMF obtains the PDU session policy information from the PCF includes sending, by the SMF, a PDU session policy information request message to the PCF, and receiving, by the SMF, the PDU session policy information sent by the PCF.

It should be understood that both the subscription information request message and the PDU session policy information request message may carry the first information, the PDU session subscription information may carry subscription information of the default GBR QoS flow, and the PDU session policy information may carry policy information of the default GBR QoS flow.

Step 505. The SMF establishes, based on a PDU session request message of the UE, and at least one of the PDU session subscription information or the PDU session policy information, the PDU session that includes the default GBR QoS flow.

To establish, by the SMF, the PDU session and the default GBR QoS flow in the PDU session, reference can be made to a process in which a PDU session is established and a GBR QoS flow is established in the PDU session in an existing solution.

Figure 8:
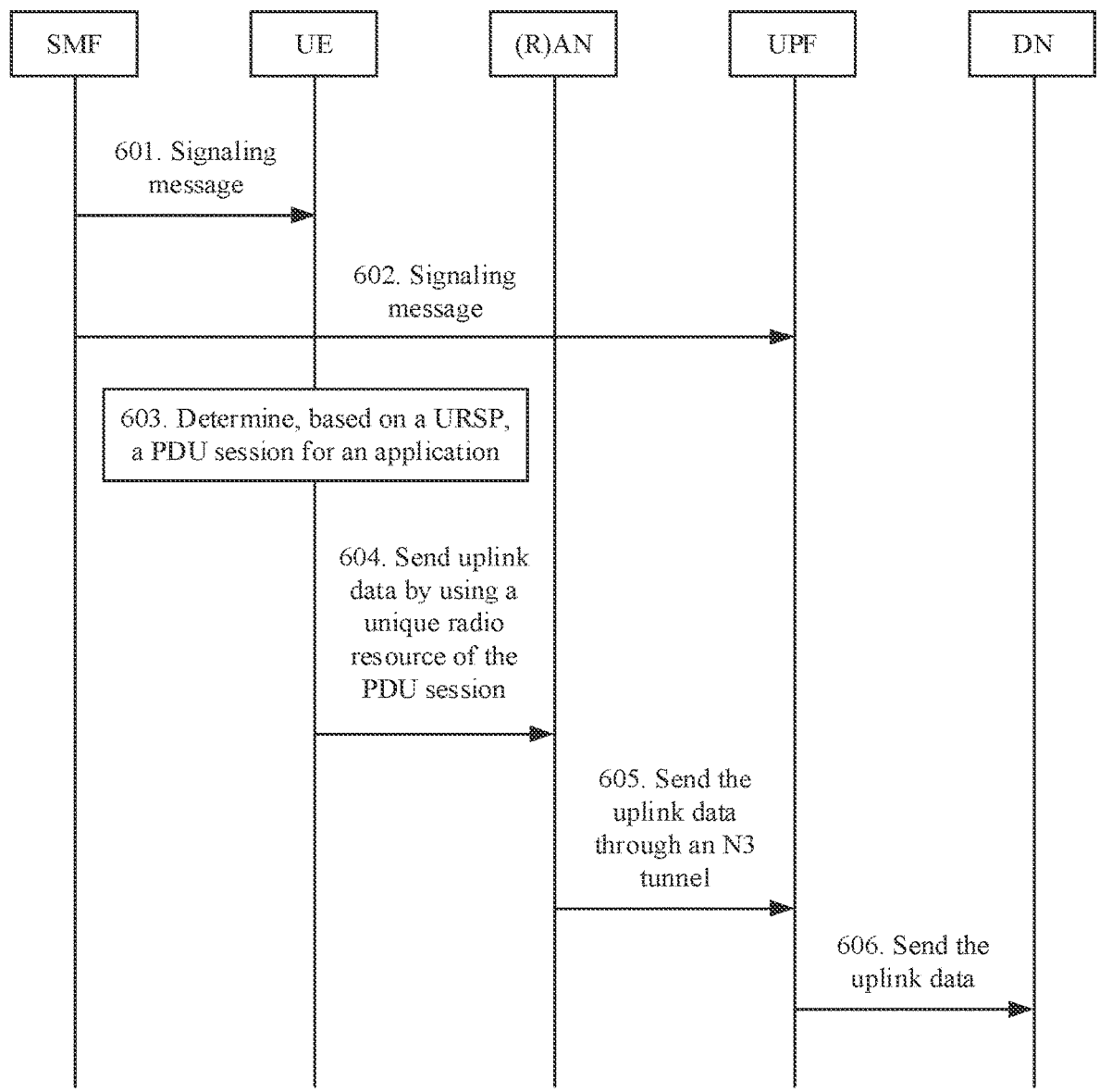
FIG. 8 is a schematic flowchart for transmitting uplink data using a default GBR QoS flow in a PDU session.
Figure 9:
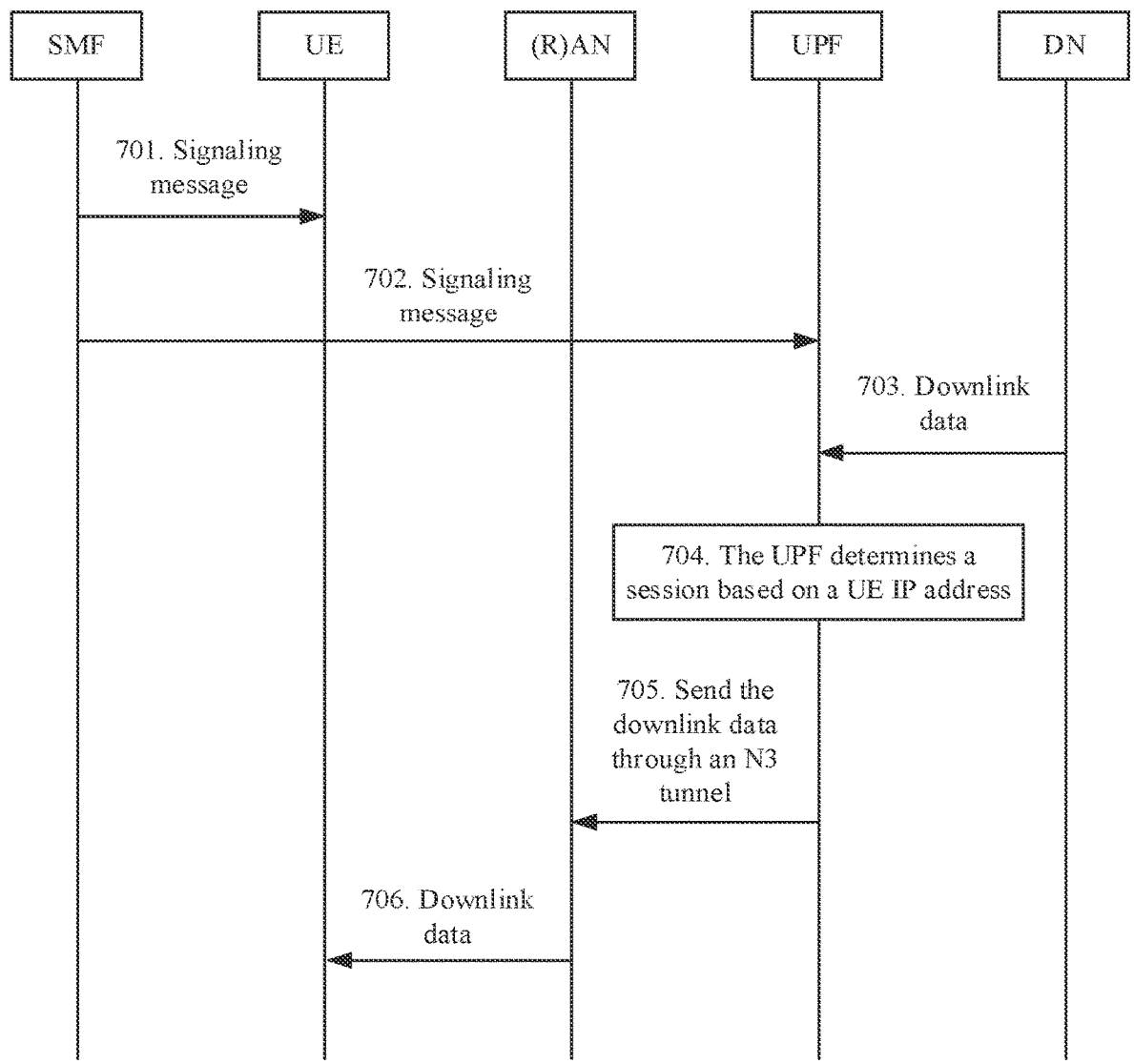
FIG. 9 is a schematic flowchart for transmitting downlink data using a default GBR QoS flow in a PDU session.

After the default GBR QoS flow is established in the PDU session, service data may be transmitted using the default GBR QoS flow. Referring to FIG. 8 and FIG. 9, a process of transmitting uplink data and downlink data using the default GBR QoS flow is described as follows.

FIG. 8 is a flowchart for transmitting uplink data using a default GBR QoS flow. A process shown in FIG. 8 includes the following steps.

Step 601. An SMF sends a signaling message to UE when a PDU session is established or modified.

Step 602. The SMF sends a signaling message to a UPF when the PDU session is established or modified.

Step 603. After receiving uplink data, the UE determines, based on a URSP, one PDU session for the uplink data.

Step 604. After determining the PDU session, the UE sends the uplink data to a RAN using a unique radio resource of the PDU session.

Step 605. The RAN sends the uplink data to the UPF through an N3 tunnel.

Step 606. After decapsulating the uplink data, the UPF sends obtained data to a DN.

It should be understood that in step 601 and step 602, when the PDU session includes only a default GBR QoS flow and does not include another GBR QoS flow or a non-GBR QoS flow, the signaling message sent by the SMF to the UE does not carry QoS rule information, and the signaling message sent by the SMF to the UPF does not carry forwarding rule information.

In addition, in step 603, when the UE has a plurality of PDU sessions, the UE needs to determine, based on the URSP, the PDU session corresponding to the uplink data.

In step 605, after receiving the uplink data, the RAN determines, based on an ID of the session determined in step 604, the N3 tunnel corresponding to the session, and then sends the uplink data to the UPF through the N3 tunnel.

In a process of transmitting the uplink data, the signaling messages sent by the SMF to the UE and the UPF do not include the QoS rule information and a forwarding rule message. In addition, the UE directly sends the uplink data to the RAN using the unique radio resource of the PDU session, such that signaling exchange in transmitting the uplink data can be simplified, and a delay of transmitting downlink data can be further reduced.

FIG. 9 is a flowchart for transmitting downlink data using a default GBR QoS flow. A process shown in FIG. 9 includes the following steps.

Step 701. An SMF sends a signaling message to UE when a PDU session is established or modified.

Step 702. The SMF sends a signaling message to a UPF when the PDU session is established or modified.

Step 703. The UPF receives downlink data sent by a DN.

Step 704. The UPF determines a session based on a UE Internet Protocol (IP) address and sends the downlink data to a RAN through an N3 tunnel corresponding to the session.

Step 705. The UPF sends the downlink data to the RAN through the N3 tunnel.

Step 706. After receiving the downlink data, the RAN sends the downlink data to the UE using a corresponding radio resource based on a correspondence between an N3 tunnel and a radio resource.

It should be understood that when the PDU session includes only a default GBR QoS flow and does not include another GBR QoS flow or a non-GBR QoS flow, in step 701 and step 702, the signaling message sent by the SMF to the UE does not carry QoS rule information, the signaling message sent by the SMF to the UPF does not carry forwarding rule information, and in step 703, when sending the downlink data to the RAN, the UPF is not required to perform QFI marking on a data packet of the downlink data.

In a process of transmitting the downlink data, the signaling messages sent by the SMF to the UE and the UPF do not include the QoS rule information and a forwarding rule message. In addition, when sending the downlink data to the RAN, the UPF is not required to perform QFI marking on the data packet of the downlink data, such that signaling exchange in the process of transmitting the downlink data can be simplified, and a delay of transmitting downlink data can be further reduced.

The foregoing describes in detail the method for establishing the GBR QoS flow in the session in the embodiments of this application referring to FIG. 1 to FIG. 9. Referring to FIG. 10 to FIG. 13, an apparatus for establishing a GBR QoS flow in a session in the embodiments of this application is described as follows. It should be understood that the apparatus for establishing the GBR QoS flow shown in FIG. 10 to FIG. 13 can perform the steps of the method for establishing the GBR QoS flow in the session in the embodiments of this application shown in FIG. 1 to FIG. 9. For brevity, repeated descriptions are properly omitted in the following descriptions of the apparatus for establishing the GBR QoS flow in the session in the embodiments of this application.

Figure 10:
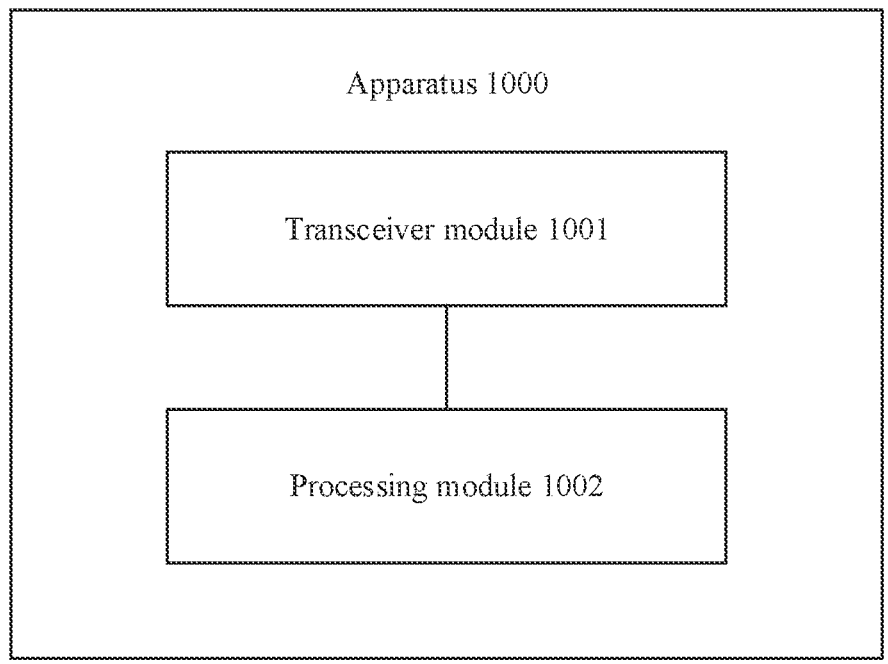
FIG. 10 is a schematic block diagram of an apparatus for establishing a GBR QoS flow in a session according to an embodiment of this application.

FIG. 10 is a schematic block diagram of an apparatus for establishing a GBR QoS flow in a session according to an embodiment of this application. An apparatus 1000 shown in FIG. 10 can perform the method for establishing the GBR QoS flow in the session according to the embodiments of this application. The apparatus 1000 includes a transceiver module 1001 configured to receive first information from an AMF, where the first information includes establishment request information of a PDU session from a terminal device, and the transceiver module is 1001 further configured to obtain PDU session management subscription information from a UDM module, and a processing module 1002 configured to, when dynamic PCC is deployed, establish, based on the first information and at least one of the PDU session management subscription information or PDU session policy information, a default GBR QoS flow in a PDU session established by the SMF, where the PDU session policy information is obtained from a PCF, or when dynamic PCC is not deployed, establish, based on the first information and at least one of the PDU session management subscription information or local PDU session policy information of the SMF, a default GBR QoS flow in the PDU session.

In this application, after receiving the first information sent by the AMF, the SMF can directly establish the default GBR QoS flow based on related information, such that time required for establishing a GBR QoS flow can be reduced when the GBR QoS flow is needed for transmitting data.

Optionally, in an embodiment, the first information includes second information, and the second information is at least one of a SUPI, a DNN, S-NSSAI, service indication information, a default GBR QoS flow indication, QoS index information, or QoS parameter information.

Optionally, in an embodiment, the transceiver module 1001 is configured to send a subscription information request message to the UDM, where the subscription information request message carries the second information, and receive the PDU session management subscription information sent by the UDM, where the PDU session management subscription information includes subscription information of the default GBR QoS flow, and the subscription information of the default GBR QoS flow includes a 5QI, an ARP, a GFBR, and a MFBR.

Optionally, in an embodiment, the transceiver module 1001 is configured to send a policy information request message to the PCF, where the policy information request message carries the second information, and receiving, the PDU session policy information sent by the PCF, where the PDU session policy information includes a default QoS rule, and the default QoS rule includes the 5QI, the ARP, the GFBR, and the MFBR of the default GBR QoS flow.

Optionally, in an embodiment, the processing module 1002 is further configured to reject a request for establishing a non-GBR QoS flow in the PDU session.

Optionally, in an embodiment, the default GBR QoS flow includes a time-sensitive GBR QoS flow.

Figure 11:
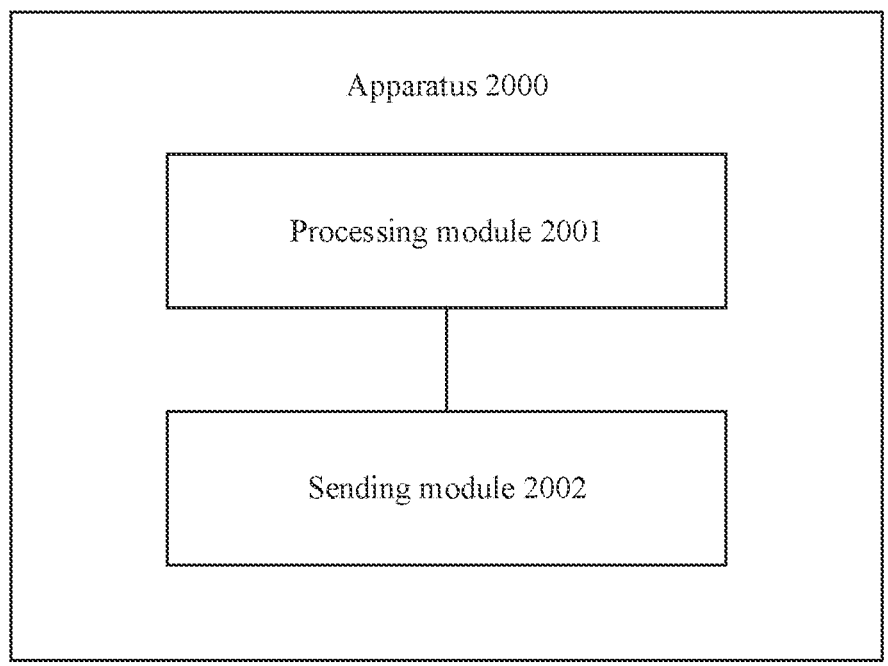
FIG. 11 is a schematic block diagram of an apparatus for establishing a GBR QoS flow in a session according to an embodiment of this application.

FIG. 11 is a schematic block diagram of an apparatus for establishing a GBR QoS flow in a session according to an embodiment of this application. An apparatus 2000 shown in FIG. 11 can perform the method for establishing the GBR QoS flow in the session according to the embodiments of this application. The apparatus 2000 includes a processing module 2001 configured to generate an establishment request message of a PDU session, where the establishment request message of the PDU session includes first indication information, and the first indication information is used to indicate that a default GBR QoS flow is to be established in the PDU session, and a sending module 2002 configured to send the establishment request message of the PDU session to a SMF, to establish a PDU session that includes the default GBR QoS flow.

Optionally, in an embodiment, the first indication information includes at least one of service indication information, a default GBR QoS flow indication, QoS index information, or QoS parameter information.

Optionally, in an embodiment, the processing module 2001 is further configured to reject a message for establishing a non-GBR QoS flow in the PDU session from the SMF.

In this application, by sending, to the AMF, the establishment request message of the PDU session including the first indication information, the apparatus 2000 can request the SMF to directly establish the default GBR QoS flow in the PDU session, thereby reducing time required for establishing the GBR QoS flow.

Optionally, in an embodiment, the default GBR QoS flow includes a time-sensitive GBR QoS flow.

Figure 12:
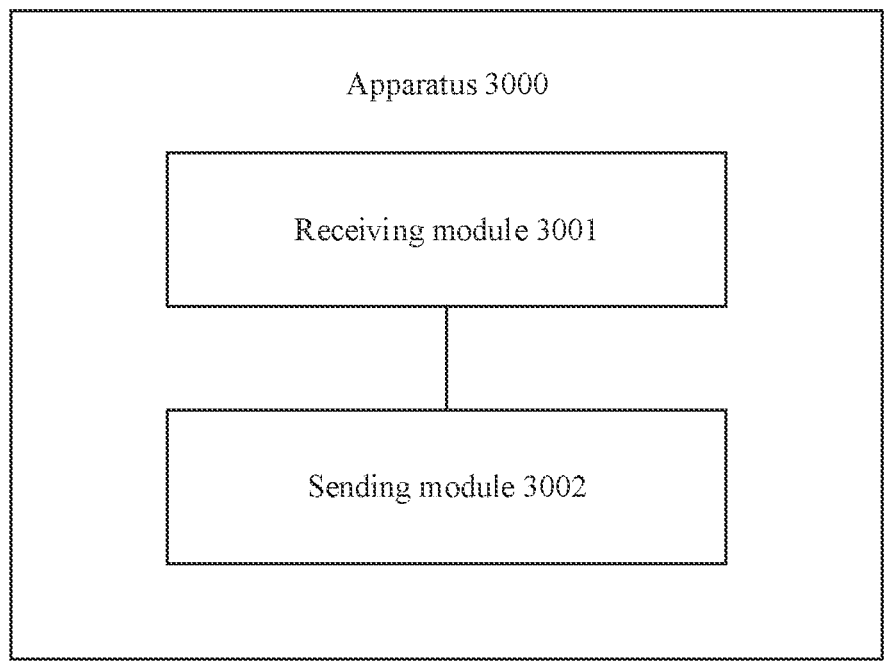
FIG. 12 is a schematic block diagram of an apparatus for establishing a GBR QoS flow in a session according to an embodiment of this application.

FIG. 12 is a schematic block diagram of an apparatus for establishing a GBR QoS flow in a session according to an embodiment of this application. An apparatus 3000 shown in FIG. 12 can perform the method for establishing the GBR QoS flow in the session according to the embodiments of this application. The apparatus 3000 includes a receiving module 3001 configured to receive a subscription information request message from a SMF, where the subscription information request message is used to request to obtain PDU session management subscription information from the UDM, the session subscription information includes subscription information of a default GBR QoS flow, and a sending module 3002 configured to send the subscription information of the default GBR QoS flow to the SMF, where the subscription information of the default GBR QoS flow is used to establish the default GBR QoS flow.

Optionally, the policy information of the default GBR QoS flow includes a 5QI, an ARP, a GFBR, and a MFBR.

In this application, after the subscription information request message is received, the subscription information of the default GBR QoS flow can be sent to the SMF, such that the SMF can directly establish the default GBR QoS flow in the PDU session by referring to the subscription information of the default GBR QoS flow, thereby reducing time required for establishing the GBR QoS flow.

This application further provides another apparatus for establishing a GBR QoS flow. The apparatus includes a receiving module 4001 and a sending module 4002 (an example structure of the apparatus is the same as that in FIG. 12, which also includes a receiving module and a sending module). Example functions of the receiving module 4001 and the sending module 4002 are as follows.

The receiving module 4001 is configured to receive a subscription information request message from a SMF, where the subscription information request message includes second information, and the second information is at least one of a SUPI, a DNN, S-NSSAI, service indication information, a default GBR QoS flow indication, QoS index information, or QoS parameter information.

The sending module 4002 is configured to send, based on the second information, subscription information of a default GBR QoS flow to the SMF, where the subscription information of the default GBR QoS flow is used to establish the default GBR QoS flow.

Optionally, the policy information of the default GBR QoS flow includes a 5QI, an ARP, a GFBR, and a MFBR.

In this application, after the second information is received, the subscription information of the default GBR QoS flow is determined to be sent to the SMF, such that the SMF can directly establish the default GBR QoS flow in the PDU session by referring to the subscription information of the default GBR QoS flow after receiving the subscription information of the default GBR QoS flow, thereby reducing time required for establishing the GBR QoS flow.

This application further provides another apparatus for establishing a GBR QoS flow. The apparatus includes a receiving module 5001 and a sending module 5002 (an example structure of the apparatus is the same as that in FIG. 12, which also includes a receiving module and a sending module). Example functions of the receiving module 5001 and the sending module 5002 are as follows.

The receiving module 5001 is configured to receive a policy information request message from a SMF, where the policy information request message is used to request to obtain PDU session policy information from the PCF, the PDU session policy information includes policy information of a default GBR QoS flow.

The sending module 5002 is configured to send the policy information of the default GBR QoS flow to the SMF, where the policy information of the default GBR QoS flow is used to establish the default GBR QoS flow.

Optionally, the policy information of the default GBR QoS flow includes a 5QI, an ARP, a GFBR, and a MFBR.

In this application, after the policy information request message is received, the policy information of the default GBR QoS flow can be sent to the SMF, such that the SMF can directly establish the default GBR QoS flow in the PDU session by referring to the policy information of the default GBR QoS flow, thereby reducing time required for establishing the GBR QoS flow.

This application further provides another apparatus for establishing a GBR QoS flow. The apparatus includes a receiving module 6001 and a sending module 6002 (an example structure of the apparatus is the same as that in FIG. 12, which also includes a receiving module and a sending module). Example functions of the receiving module 6001 and the sending module 6002 are as follows.

The receiving module 6001 is configured to receive a policy information request message from a SMF, where the policy information request message includes second information, and the second information is at least one of a SUPI, a DNN, S-NSSAI, service indication information, a default GBR QoS flow indication, QoS index information, QoS parameter information, or session subscription information.

The sending module 6002 is configured to send, based on the second information, policy information of a default GBR QoS flow to the SMF.

Optionally, the policy information of the default GBR QoS flow includes a 5QI, an ARP, a GFBR, and a MFBR.

In this application, after the second information is received, the policy information of the default GBR QoS flow is determined to be sent to the SMF, such that the SMF can directly establish the default GBR QoS flow in the PDU session by referring to the policy information of the default GBR QoS flow after receiving the policy information of the default GBR QoS flow, thereby reducing time required for establishing the GBR QoS flow.

Figure 13:
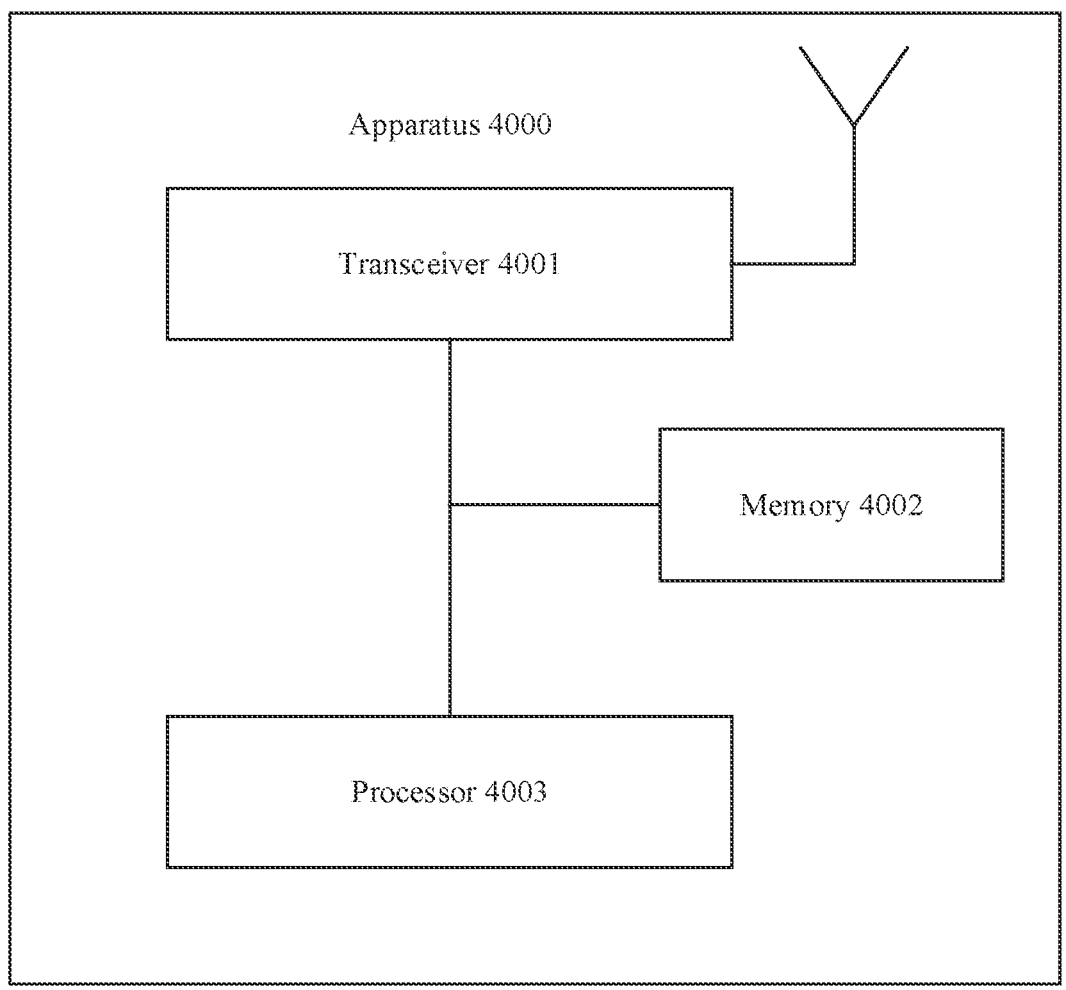
FIG. 13 is a schematic block diagram of an apparatus for establishing a GBR QoS flow in a session according to an embodiment of this application.

FIG. 13 is a schematic block diagram of an apparatus for establishing a GBR QoS flow in a session according to an embodiment of this application. An apparatus 4000 shown in FIG. 13 can perform the method for establishing the GBR QoS flow in the session according to the embodiments of this application. The apparatus 4000 includes a transceiver 4001, a memory 4002 configured to store a program, a processor 4003 configured to execute the program stored in the memory 4002, wherein when the program stored in the memory 4002 is executed, the processor 4003 and the transceiver 4001 are configured to perform the steps of the method for establishing the default GBR QoS flow in the session in the embodiments of this application.

The transceiver 4001 and the processor 4003 may include a large quantity of transistors, logic gate circuits, or circuit devices. The transceiver 4001 and the processor 4003 may be located on different chips or a same chip. The memory is usually located on an independent chip, or may be located on the same chip as the transceiver 4001 and the processor 4003. Further, the transceiver 4001 may be coupled to one or more antennas.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The software product is stored in a storage medium, and includes several instructions for instructing a computer device (which may be a personal computer, a server, or a network device) to perform all or some of the steps of the method described in the embodiments of this application. The foregoing storage medium includes any medium that can store program code, such as a universal serial bus (USB) flash drive, a removable hard disk, a read-only memory (ROM), a random-access memory (RAM), a magnetic disk, or an optical disc.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for establishing a guaranteed bit rate (GBR) quality of service (QoS) flow in a session, wherein the method comprises:

receiving, by a session management function entity and from an access and mobility management function entity, first information requesting establishment of the session; and establishing, by the session management function entity, a default GBR QoS flow in the session based on local session policy information of the session management function entity; or establishing, by the session management function entity, the default GBR QoS flow in the session based on session policy information from a policy control function entity or based on session management subscription information from a unified data management module entity.

2. The method of claim 1, wherein the first information comprises a data network name (DNN), and wherein establishing, by the session management function entity, the default GBR QoS flow comprises establishing, by the session management function entity, the default GBR QoS flow based on the DNN.

3. The method of claim 2, wherein the first information comprises single network slice selection assistance information (S-NSSAI), a subscription permanent identifier, service indication information, a default GBR QoS flow indication, QoS index information, or QoS parameter information.

4. The method of claim 1, wherein the default GBR QoS flow comprises a time-sensitive GBR QoS flow for transmitting time-sensitive service data.

5. The method of claim 1, wherein the session comprises a protocol data unit (PDU) session.

6. The method of claim 1, wherein the local session policy information comprises policy information of the default GBR QoS flow.

7. An apparatus implementing session management for establishing a guaranteed bit rate (GBR) quality of service (QoS) flow in a session, the apparatus comprising:
a memory configured to store instructions; and
a processor coupled to the memory and configured to execute the instructions to cause the apparatus to:
receive, from an access and mobility management function entity, first information requesting establishment of the session; and
establish a default GBR QoS flow in the session based on local session policy information of the apparatus; or establish the default GBR QoS flow in the session based on session policy information from a policy control function entity or based on session management subscription information from a unified data management module entity.

8. The apparatus of claim 7, wherein the first information comprises a data network name (DNN), and wherein the processor is further configured to execute the instructions to cause the apparatus to establish the default GBR QoS flow by establishing the default GBR QoS flow based on the DNN.

9. The apparatus of claim 8, wherein the first information comprises single network slice selection assistance information (S-NSSAI), a subscription permanent identifier, service indication information, a default GBR QoS flow indication, QoS index information, or QoS parameter information.

10. The apparatus of claim 7, wherein the default GBR QoS flow comprises a time-sensitive GBR QoS flow for transmitting time-sensitive service data.

11. The apparatus of claim 7, wherein the session comprises a protocol data unit (PDU) session.

12. The apparatus of claim 7, wherein the processor is configured to execute the instructions to cause the apparatus to establish the default GBR QoS flow by establishing the default GBR QoS flow based on the local session policy information when dynamic policy and charging control (PCC) is not deployed.

13. The apparatus of claim 7, wherein the local session policy information comprises policy information of the default GBR QoS flow.

14. The apparatus of claim 7, wherein the processor is configured to execute the instructions to cause the apparatus to further establish the default GBR QoS flow by establishing the default GBR QoS flow based on the session management subscription information or the session policy information when dynamic policy and charging control (PCC) is deployed.

15. The apparatus of claim 14, wherein the processor is further configured to execute the instructions to cause the apparatus to:
send a subscription information request message to the unified data management module entity; and
receive the session management subscription information from the unified data management module entity in response to the subscription information request message, wherein the session management subscription information comprises a fifth generation QoS identifier (5QI), an allocation and retention priority (ARP), a guaranteed flow bit rate (GFBR), or a maximum flow bit rate (MFBR).

16. The apparatus of claim 14, wherein the processor is further configured to execute the instructions to cause the apparatus to:
send a policy information request message to the policy control function entity; and
receive the session policy information from the policy control function entity in response to the policy information request message, wherein the session policy information comprises a fifth generation QoS identifier (5QI), an allocation and retention priority (ARP), a guaranteed flow bit rate (GFBR), or a maximum flow bit rate (MFBR).

17. The method of claim 1, wherein establishing, by the session management function entity, the default GBR QoS flow comprises establishing, by the session management function entity, the default GBR QoS flow based on the local session policy information when dynamic policy and charging control (PCC) is not deployed.

18. The method of claim 1, wherein establishing, by the session management function entity, the default GBR QoS flow comprises establishing, by the session management function entity, the default GBR QoS flow based on the session management subscription information or the session policy information when dynamic policy and charging control (PCC) is deployed.

19. The method of claim 18, further comprising:
sending, by the session management function entity, a subscription information request message to the unified data management module entity; and
receiving, by the session management function entity, the session management subscription information from the unified data management module entity in response to the subscription information request message, wherein the session management subscription information comprises a fifth generation QoS identifier (5QI), an allocation and retention priority (ARP), a guaranteed flow bit rate (GFBR), or a maximum flow bit rate (MFBR).

20. The method of claim 18, further comprising:
sending, by the session management function entity, a policy information request message to the policy control function entity; and
receiving, by the session management function entity, the session policy information from the policy control function entity in response to the policy information request message, wherein the session policy information comprises a fifth generation QoS identifier (5QI), an allocation and retention priority (ARP), a guaranteed flow bit rate (GFBR), or a maximum flow bit rate (MFBR).

21. The method of claim 1, further comprising sending, by the access and mobility management function entity, the first information.

22. A system comprising:
an access and mobility management function entity configured to send first information, wherein the first information requests establishment of a session; and
a session management function entity configured to:
receive the first information from the access and mobility management function entity; and
establish a default guaranteed bit rate (GBR) quality of service (QoS) flow in the session based on local session policy information of the session management function entity; or establish the default GBR QoS flow based on session policy information from a policy control function entity or based on session management subscription information from a unified data management module entity.

23. The system of claim 22, wherein the session management function entity is configured to establish the default GBR QoS flow by establishing the default GBR QoS flow based on the local session policy information when dynamic policy and charging control (PCC) is not deployed.

24. The system of claim 22, wherein the session management function entity is configured to further establish the default GBR QoS flow by establishing the default GBR QoS flow based on the session management subscription information or the session policy information when dynamic policy and charging control (PCC) is deployed.

25. The system of claim 22, wherein the first information comprises a data network name (DNN), and wherein the session management function entity is configured to establish the default GBR QoS flow by establishing the default GBR QoS flow based on the DNN.

26. The method of claim 19, further comprising:
receiving, by the unified data management module entity, the subscription information request message; and
sending, by the unified data management module entity, the session management subscription information to the session management function entity.

27. The method of claim 20, further comprising:
receiving, by the policy control function entity, the policy information request message; and
sending, by the policy control function entity, the session policy information to the session management function entity.

28. The system of claim 24, further comprising a unified data management module entity, wherein the session management function entity is further configured to:
send a subscription information request message to the unified data management module entity; and
receive the session management subscription information from the unified data management module entity in response to the subscription information request message, wherein the session management subscription information comprises a fifth generation QoS identifier (5QI), an allocation and retention priority (ARP), a guaranteed flow bit rate (GFBR), or a maximum flow bit rate (MFBR), and
wherein the unified data management module entity is configured to:
receive the subscription information request message; and
send the session management subscription information to the session management function entity.

29. The system of claim 24, further comprising the policy control function entity, wherein the session management function entity is further configured to:
send a policy information request message to the policy control function entity; and
receive the session policy information from the policy control function entity in response to the policy information request message, wherein the session policy information comprises a fifth generation QoS identifier (5QI), an allocation and retention priority (ARP), a guaranteed flow bit rate (GFBR), or a maximum flow bit rate (MFBR), and
wherein the policy control function entity is configured to:
receive the policy information request message; and
send the session policy information to the session management function entity.

\* \* \* \* \*